Patented Aug. 28, 1951

2,566,097

UNITED STATES PATENT OFFICE 2,566,097

2-(3:4-DIHYDROXYPHENYL)MORPHOLINE AND ITS PREPARATION

Otto Thomä, Ingelheim-on-the-Rhine, Germany, assignor to Ernst Boehringer, Albert Boehringer, Julius Liebrecht, and Ilse Liebrecht born Boehringer, trading under the firm of C. H. Boehringer Sohn, Ingelheim-on-the-Rhine, Germany No Drawing. Application December 21, 1949, Serial No. 134,341. In France March 2, 1948

6 Claims. (Cl. 260—247.7)

This invention is concerned with improvements in or relating to the preparation of 2-(3:4-dihydroxyphenyl)morpholine from 1-(3:4-dihydroxyphenyl)-1-hydroxy-2-ethanolaminoethane.

Up to the present time morpholine derivatives have been little investigated and mostly N-substituted morpholine compounds have been prepared, of which only the phenylethanolmorpholine of Rubin and Day (J. Org. Chem. 5, 54, (1940)) should be mentioned. Further Bovet and Benoit (J. Pharm. Chem., 22, 127, 544 (1935)) have described two benzomorpholines. All the hitherto described morpholine derivatives differ greatly from the substance of the present invention and up to now no description has been made of anything which in anyway approaches the process according to the invention.

According to the invention therefore there is provided a process for the preparation of 2-(3:4-dihydroxyphenyl)morpholine in which 1-(3:4-dihydroxyphenyl)-1-hydroxy-2-ethanolaminoethane in the form of a solution of one or more of its salts with or without the addition of acid is allowed to stand for a prolonged period at ordinary temperature or alternatively a solution of the salt or salts with or without the addition of acid is heated at an elevated temperature. As solvents organic solvents, for example alcohol are chiefly used.

It is surprising that 1-(3:4-dihydroxyphenyl)-1-hydroxy-2-ethanolaminoethane can be so readily converted into 2-(3:4-dihydroxyphenyl)-morpholine by ring closure. To convert di-N-ethanolamine into the simple morpholine it is known that remarkably energetic conditions are required such for example as heating with concentrated hydrochloric acid or 70% sulphuric acid to temperatures of over 100° C.

The 2-(3:4-dihydroxyphenyl)morpholine obtained according to the invention appears to be a very stable compound in comparison with the 1-(3:4-dihydroxyphenyl)-1-hydroxy-2-ethanolaminoethane used as starting material. It can in the form of its salt be readily sterilised and the free base is stable towards alkali and acid for days.

In order that the invention may be well understood the following examples are given only by way of illustrations, but it must be understood that the invention is not restricted to the times, reaction temperatures and the like as stated in the examples.

Example 1

A solution of 100 grs. 1-(3:4-dihydroxyphenyl)-1-hydroxy-2-ethanolaminoethane hydrochloride in 100 cc. methyl alcohol is allowed to stand at room temperature. In spite of frequent innoculation crystals first begin to appear after 48 hours. After 72 hours 16.4 grs. 2-(3:4-dihydroxyphenyl)morpholine hydrochloride (M. P. 221° C.) can be filtered off. On further standing for several days further crops of 2-(3:4-dihydroxyphenyl)morpholine hydrochloride may be obtained from the mother liquor.

Example 2

100 grs. 1-(3:4-dihydroxyphenyl)-1-hydroxy-2-ethanolaminoethane hydrochloride are dissolved in 1000 cc. methyl alcohol, the solution boiled under reflux for five hours in the presence of carbon dioxide and then concentrated to 150 grs. under normal pressure. Immediately rapid crystallisation sets in. After cooling the product is filtered off, washed with absolute alcohol and 50.5 grs. 2-(3:4-dihydroxyphenyl)-morpholine hydrochloride is obtained. The molten liquor is taken to dryness in a porcelain dish on a water bath. The crystal cake obtained in this is triturated with a little absolute alcohol and filtered whereby a further 38 grs. of satisfactory 2-(3:4-dihydroxyphenyl)morpholine hydrochloride, M. P. 221° C. is obtained, so that the total yield is 88.5 grs. i. e. 95.4% of theory.

The free morpholine base can be set free from its salts in usual manner e. g. by addition of soda lye. It is separated from the formed sodium salt by dissolving it in a suitable organic solvent, as ether etc.

What I claim is:

1. A process for the preparation of 2-(3:4-dihydroxyphenyl)morpholine in which a solution of a salt of 1-(3:4-dihydroxyphenyl)-1-hydroxy-2-ethanolaminoethane is allowed to stand whereupon the morpholine base is set free and separated in usual manner.

2. A process according to claim 1 wherein the solution is held at a range of temperature substantially above room temperature and up to the boiling point of the solution.

3. A process according to claim 1 wherein said solution contains acid.

4. A process according to claim 1 wherein the product is set free from its acid salt by the addition of a caustic alkali.

5. As a new product a compound of the group consisting of 2-(3:4-dihydroxyphenyl)morpholine and its acid addition salts.

6. As a new product 2-(3:4-dihydroxyphenyl)morpholine hydrochloride.

OTTO THOMÄ.

REFERENCES CITED

The following references are of record in the file of this patent:

FOREIGN PATENTS

| Number | Country | Date |
|---|---|---|
| 713,382 | France | Oct. 27, 1931 |